Patented Oct. 22, 1935

2,018,508

UNITED STATES PATENT OFFICE 2,018,508

MANUFACTURE OF RUBBER ARTICLES

Arthur E. Barnard, Waterbury, Conn., assignor, by mesne assignments, to United States Rubber Company, New York, N. Y., a corporation of New Jersey No Drawing. Application October 4, 1933, Serial No. 692,148

12 Claims. (Cl. 18—58)

This invention relates to the manufacture of rubber articles from latex, and more particularly to the production of crinkled surfaces on such articles.

In the preparation of rubber articles from latex by form-dipping and like processes, it has been proposed to provide a wrinkled surface on the outer surface of the latex film by coagulating the outer surface of the latex film, by a heat or chemical coagulation, while retaining the underneath layer of the latex film in a still uncoagulated condition, in order to produce a crinkling or wrinkling effect of the outer coagulated skin, whereupon underneath layers are subsequently completely coagulated by continuing the drying or chemical coagulation process.

According to the present invention a latex film applied to a form is chemically coagulated by diffusion of a chemical coagulant from the inside of the latex film outwardly and the outer surface of the latex film, before coagulation thereof, is treated with a swelling agent. The latex film and coagulant may be applied to the form by dipping, spraying, spreading, or the like methods, and in a like manner the swelling agent, commonly an organic solvent such as benzene, carbon disulphide, chloroform, carbon tetrachloride or the like, may be applied to the outer surface of the latex film. The form, of course, may be a permanent part or base of the rubber article, or the finished rubber film, preferably after vulcanization, may be stripped from the deposition surface of the form, as is well known.

In the following examples of carrying out the invention, which are intended to be non-limiting and merely illustrative thereof, a latex compound as follows was used, it being obvious, however, that various compounded latices might be substituted therefor, as desired:

| | |
|---|---|
| Rubber as creamed latex—59.75% concentration | 100 |
| Water in creamed latex | 67.40 |
| Stabilizer | 1.25 |
| Formaldehyde (40% formalin) | 4.75 |
| Sulphur | 2.50 |
| Glue | 0.10 |
| Zinc oxide | 1.00 |
| Antioxidant | 0.35 |
| Sodium silicate | 0.50 |
| Accelerator | 2.00 |

Glazed porcelain forms commonly used in the preparation of dipped gloves were first dipped in the above latex compound and withdrawn almost immediately, air dried for about 2 minutes and then dipped into a 1:1 solution (by weight) of glacial acetic acid and 95% ethyl alcohol, withdrawn at once, and air dried for 5 minutes to form a coating of coagulant adhered to the surface of the form by a thin rubber deposit. The form was then dipped a second time in the latex compound and left in for a minute, which was a sufficient time for obtaining the desired thickness of latex film, removed and allowed to drain for 1 minute, or until the film stopped flowing. The coated form from which the coagulant was thus diffusing outwardly toward the surface of the latex film was then immersed in a solvent for 30 seconds, removed, and air dried until the solvent had evaporated, following which the latex film was cured 15 minutes in water at 185–190° F. The outer surface of the latex in this manner was provided with a crinkled or wrinkled surface. Immersing the latex film in the solvent for 5 seconds has likewise been found sufficient for producing the crinkled effect. About 30 seconds appears the optimum length of time of immersion and leaving the films in the solvent for a minute or longer shows no increase in wrinkling effect over the 30 second dip. An after treatment of the solvent wrinkled film by dipping in 1:1 acetic acid-alcohol mixture produced no improvement or visible effect. Various swelling agents or solvents such as benzene, carbon disulphide, chloroform, and carbon tetrachloride were used, the relative degree or intensity of wrinkling appearing to be in the increasing order as above named, the last three, however, being very close in the intensity of wrinkling produced; all of which is in agreement with the swelling action of these solvents on raw rubber. Mixtures of such solvents may of course be utilized as well as other solvents, e. g. toluene, xylene, tetrahydronaphthalene, tetrachlorethane, or other active or strong swelling agents as for example those listed in the International Critical Tables, vol. II, page 271.

The same process was used in another similar series of examples where the period of drying at room temperature was extended progressively from one minute to 15 hours before dipping each treated form for 30 seconds in carbon tetrachloride. It was observed in this series that wrinkling became less noticeable as the period of drying was extended and the coagulant had a chance to diffuse to the outer surface prior to dipping in the swelling agent. The wrinkling effect was observed up to 40 minutes after which time the coagulant had apparently diffused outwardly sufficiently to coagulate the latex on the outer surface of the film, and/or substantially complete drying of the outer surface had occurred. Completely dried films tended to swell uniformly without wrinkling on treatment with solvent.

Another method of causing a diffusion from an inner stratum to the outer surface of the latex film is to treat the form surface itself, which may be porous or non-porous as desired, with a coagulant and then dip the thus treated form in latex to form a rubber adhesive film for holding additional coagulant subsequently applied. When treating the form itself with a coagulant prior to dipping in latex to form the film proper, it is frequently advisable to mix with the coagulant some substance which will adhere readily to the surface of the form and form a body for holding the coagulant until the thus treated form is contacted with the latex. Gelatinous materials, clay and the like, have been found to provide a smooth surface of coagulating material on the form when mixed with the coagulant in desired proportions. A series of forms were dipped into such a coagulant which was made to adhere evenly to the surface of the form and then into the latex compound and allowed to remain for a minute as in the previous examples, removed and allowed to drain for various periods of time, before immersing in the solvent for thirty seconds, and then removing, drying, and vulcanizing. The wrinkling effected by the solvent, in this case carbon tetrachloride, was as in the prior examples likewise hardly noticeable after an air drying period of 40 minutes prior to dipping in the swelling agent, but was entirely satisfactory at the shorter time intervals as noted in previous examples.

In both the above methods of applying the coagulant so that it diffuses from the inside of the latex film outwardly, tests were run to determine if it were possible that the latex dipped film could be too wet to show wrinkling in solvent. It was found that such was not the case. A latex film of the desired thickness was removed from the latex bath, given one quick shake and immediately plunged into carbon tetrachloride. The wrinkling effect was similar to that obtained in the experiments where the draining period after the latex dip was from 1 to 40 minutes showing that excess moisture in the latex film being coagulated by diffusion from inside outwardly was not harmful to the production of a satisfactory wrinkled surface. In actual practice of course a certain amount of delay is necessary in order to revolve the coated forms until flowing has ceased and the film is distributed uniformly. This period of delay is longer with large bulky forms than with smaller forms, assuming the viscosity of the latex is the same in each case. The present method, as has been shown, is of course sufficiently flexible to allow for all necessary delays after the latex coating and prior to the solvent treatment. The nature, components and concentration of the coagulating material, by either process above described may be subject to wide variation without affecting the ultimate success of the process as will be obvious. It is obvious that coagulation of the film from the inside surface outwardly is a more logical procedure than coagulation from the outside inwardly, the latter procedure resulting in an impenetrable outer surface while the inner surface remains in liquid condition. The coagulation, of course, from the inside outwardly aids in the drying of the rubber film by virtue of the syneresis or squeezing out of the aqueous portions resulting from the coagulation of the inner portions of the latex film prior to the drying of the outer surface.

While the foregoing examples are illustrative of the present invention as applied to rigid forms, it is possible and entirely practical to substitute semi-rigid forms or flexible backings such as fabric, leather, etc. for these rigid forms. In these instances the latex coating and coagulating medium may be applied, as for example on a fabric backing, by dipping, spreading, or spraying processes, or combination of same, as known in the art, followed by a swelling step with a suitable solvent to produce the desired wrinkled surface as disclosed. The term "form" as used herein is intended to include such other forms and backings, as well as rigid porous and non-porous forms, and whether such become a permanent part or base of the rubber article, or the rubber article is removed therefrom.

The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art.

With the above detailed disclosure of the invention, it is evident that numerous modifications will suggest themselves to those skilled in the art, and it is not desired to limit the invention otherwise than required by the state of the art and as set forth in the appended claims.

Having thus described my invention, what I claim and desire to protect by Letters Patent is:

1. The process of manufacturing a rubber article having a wrinkled surface comprising coating a form with latex, chemically coagulating the latex coating from an inner stratum outwardly, and applying a swelling agent to the outer surface of the coating before substantially complete drying thereof.

2. The process of manufacturing a rubber article having a wrinkled surface comprising coating a form with latex, chemically coagulating the latex coating from an inner stratum outwardly, and applying a swelling agent to the outer surface of the coating before coagulation thereof.

3. The process of manufacturing a rubber article having a wrinkled surface comprising coating a form with latex, coagulating the latex coating by diffusion of a chemical coagulant from an inner stratum outwardly toward the surface of the coating, and applying a swelling agent to the outer surface of the coating before substantially complete drying thereof.

4. The process of manufacturing a rubber article having a wrinkled surface comprising coating a form with latex, coagulating the latex coating by diffusion of a chemical coagulant from an inner stratum outwardly toward the surface of the coating, and applying a swelling agent to the outer surface of the coating before coagulation thereof.

5. The process of manufacturing a rubber article having a wrinkled surface comprising associating a coagulant with a form, coating the thus treated form with latex, and applying a swelling agent to the outer surface of the coating before substantially complete drying thereof.

6. The process of manufacturing a rubber article having a wrinkled surface comprising associating a coagulant with a form, coating the thus treated form with latex, and applying a swelling agent to the outer surface of the coating before coagulation thereof.

7. The process of manufacturing dipped rubber articles having a wrinkled surface comprising coating a form with a latex coagulant, immersing the thus coated form into latex, removing the form from the latex, and applying a swelling agent to the outer surface of the latex deposit before substantially complete drying thereof.

8. The process of manufacturing dipped rubber articles having a wrinkled surface comprising coating a form with a latex coagulant, immersing the thus coated form into latex, removing the form from the latex, and applying a swelling agent to the outer surface of the latex deposit before coagulation thereof.

9. The process of manufacturing dipped rubber articles having a wrinkled surface comprising immersing a form into latex, removing, and applying a latex coagulant to the thus coated form, reimmersing the thus treated form into latex, and removing, and applying a swelling agent to the outer surface of the latex deposit before substantially complete drying thereof.

10. The process of manufacturing dipped rubber articles having a wrinkled surface comprising immersing a form into latex, removing, and applying a latex coagulant to the thus coated form, reimmersing the thus treated form into latex, and removing, and applying a swelling agent to the outer surface of the latex deposit before coagulation thereof.

11. The process of manufacturing dipped rubber articles having a wrinkled surface comprising coating a form with a latex coagulant, immersing the thus coated form into latex, removing the form from the latex, and within 40 minutes immersing the thus treated form in a swelling agent.

12. The process of manufacturing dipped rubber articles having a wrinkled surface comprising immersing a form into latex, removing, and applying a latex coagulant to the thus coated form, reimmersing the thus treated form into latex, and removing, and within 40 minutes immersing the same in a swelling agent.

ARTHUR E. BARNARD.